United States Patent [19]

Ando

[11] Patent Number: 4,831,441
[45] Date of Patent: May 16, 1989

[54] SCAN CONVERTER APPARATUS

[75] Inventor: Naotaka Ando, Saitama, Japan

[73] Assignee: Sony Corporation, Tokyo, Japan

[21] Appl. No.: 110,832

[22] Filed: Oct. 21, 1987

[30] Foreign Application Priority Data

Oct. 21, 1986 [JP] Japan ............................... 61-250592

[51] Int. Cl.$^4$ ..................... H04N 11/06; H04N 11/20; H04N 7/01; H04N 7/04
[52] U.S. Cl. ........................................ 358/140; 358/11; 358/12; 358/141
[58] Field of Search ................... 358/11, 12, 140, 141, 358/22

[56] References Cited

U.S. PATENT DOCUMENTS

| | | | |
|---|---|---|---|
| 4,075,656 | 2/1978 | Beaulier | 358/141 |
| 4,426,661 | 1/1984 | Okada et al. | 358/140 |
| 4,583,113 | 4/1986 | Pritchard | 358/11 |
| 4,651,209 | 3/1987 | Okada et al. | 358/140 |
| 4,658,293 | 4/1987 | Arai et al. | 358/140 |
| 4,673,981 | 6/1987 | Lippman et al. | 358/141 |

*Primary Examiner*—James J. Groody
*Assistant Examiner*—John K. Peng
*Attorney, Agent, or Firm*—Hill, Van Santen, Steadman & Simpson

[57] ABSTRACT

A scan converter apparatus, for converting an input video signal having a line frequency $f_{H1}$ into an output video signal having a line frequency of substantially $f_{H2}$, has means for generating a signal with a line frequency m/n times the horizontal synchronizing signal of the input video signal by approximating a line frequency ratio of $f_{H1}/f_{H2}$ to n/m, where m and n are both integers, and controlling the reading operation from a memory in synchronism with the resultant line frequency signal to thereby produce the output video signal, so that even when the line frequency $f_{H2}$ is not an integer multiple of the line frequency $f_{H1}$, it is possible to satisfactorily obtain the output video signal of which the horizontal line frequency is $f_{H2}$.

8 Claims, 4 Drawing Sheets

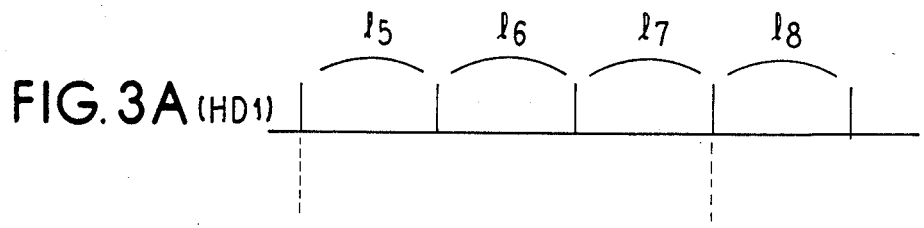
FIG. 3A (HD1)
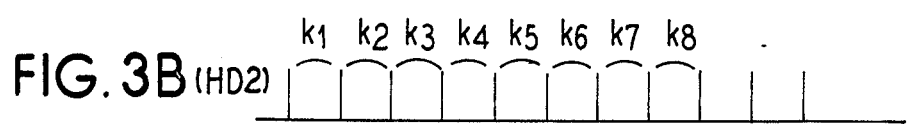
FIG. 3B (HD2)
FIG. 4A
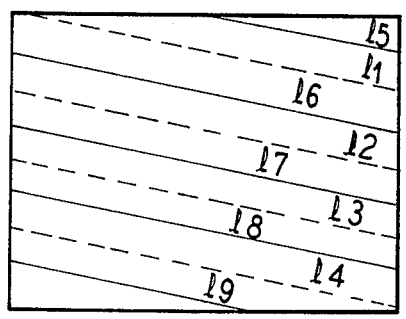
FIG. 4B
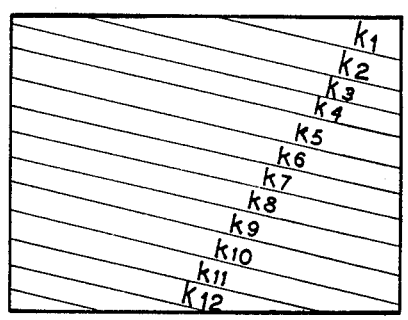

SCAN CONVERTER APPARATUS

BACKGROUND OF THE INVENTION

1. Field of the Invention

This invention relates generally to scan converters and more particularly to a scan converter apparatus for a video signal to provide an output video signal having a horizontal frequency different from that of an input video signal.

2. Description of the Prior Art

A scan converter apparatus has been proposed so far to provide an output video signal having a horizontal or line frequency different from that of an input video signal. Conventional scan converter apparatus is generally adapted to convert an input video signal into a video signal having a doubled (integral multiple) horizontal frequency, for example, to convert an interlaced video signal into a double-scanning non-interlaced video signal or the like.

The advent of various computers, however, causes video signals to have different line frequencies ranging, for example, from 15 kHz to 64 kHz. To reproduce the video signals having different line frequencies by a single monitor television receiver, a scan converter apparatus must be provided to convert an input video signal having an arbitrary line frequency into an output video signal of which the line frequency is selected to be a fixed value.

However, when a line frequency $f_{H2}$ of an output video signal is not selected to be an integer multiple of a line frequency $f_{H1}$ of an input video signal, it becomes difficult to interpolate the signal and the input video signal cannot be converted into the output video signal having a proper line frequency.

OBJECTS AND SUMMARY OF THE INVENTION

Accordingly, it is an object of this invention to provide an improved scan converter apparatus.

It is another object of this invention to provide a scan converter apparatus which can satisfactorily convert an input video signal having a horizontal frequency $f_{H1}$ into an output video signal having a horizontal frequency $f_{H2}$ even when the horizontal frequency $f_{H2}$ of the output video signal is not an integral multiple of the horizontal frequency $f_{H1}$ of the input video signal.

According to one aspect of the present invention, there is provided a scan converter apparatus for converting an input video signal having a line frequency $f_{H1}$ into an output video signal of which the line frequency is substantially $f_{H2}$ comprising:

(a) memory means for storing said input video signal in synchronism with its horizontal synchronizing signal;

(b) means for approximating a ratio of $f_{H1}/f_{H2}$ between said line frequencies of said input and output video signals to n/m (where m and n are both integers);

(c) a phase locked loop circuit including a phase comparator, a low-pass filter and a voltage-controlled oscillator and supplied with the horizontal synchronizing signal of said input video signal and for generating a signal having a line frequency m/n times the line frequency $f_{H1}$ of said input video signal; and (d) control means for controlling the reading operation from said memory in synchronism with said line frequency signal to thereby generate said output video signal.

These and other objects, features and advantages of the present invention will become apparent from the following detailed description of the preferred embodiment to be taken in conjunction with the accompanying drawings, throughout which like reference numerals identify like elements and parts.

BRIEF DESCRIPTION OF THE DRAWINGS

FIGS. 3A and 3B are schematic diagrams respectively used to explain the embodiment of the present invention, particularly, the relationship between the horizontal synchronizing signal of an input video signal and the horizontal synchronizing signal of an output video signal;

FIGS. 4A and 4B are schematic diagrams respectively showing the scanning lines of the input and output video signals for a ratio of $\frac{2}{3}$;

DESCRIPTION OF THE PREFERRED EMBODIMENT

An embodiment of a scan converter apparatus according to the present invention will now be described with reference to the attached drawings.

Figure 1:
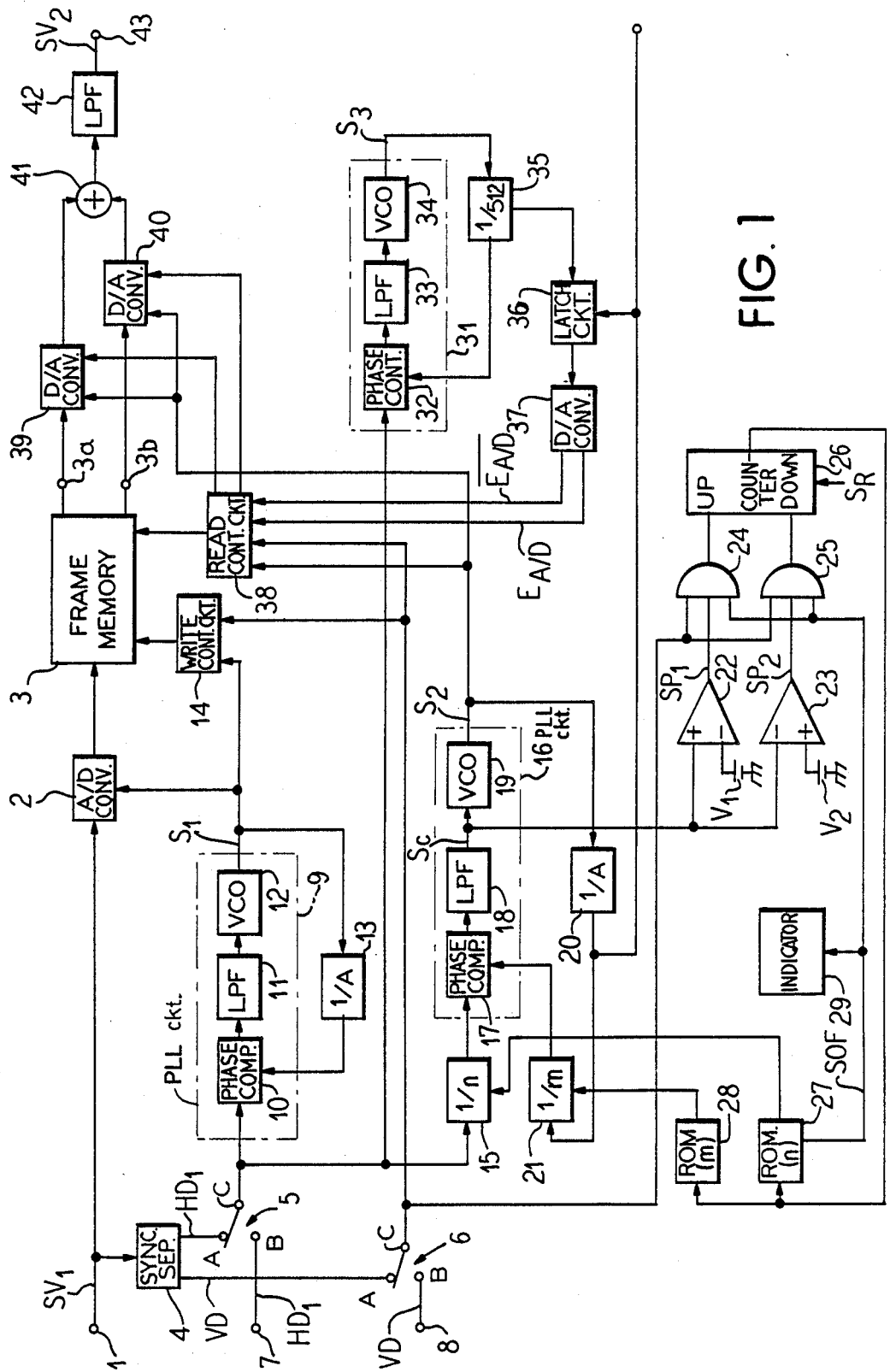
FIG. 1 is a block diagram illustrating an embodiment of a scan converter apparatus according to the present invention.

Referring to FIG. 1, there is shown an input terminal 1, and a video signal SV1 having a horizontal or line frequency $f_{H1}$ is applied to the input terminal 1. The video signal SV1 applied to the input terminal 1 is supplied through an A/D (analog-to-digital) converter 2 to a frame memory 3.

Also, the video signal SV1 is supplied to a sync (synchronizing) separator circuit 4. The horizontal synchronizing signal HD1 and a vertical synchronizing signal VD from the sync. separator circuit 4 are supplied respectively to fixed contacts A of a change-over switches 5 and 6. Alternatively, the horizontal synchronizing signal HD1 and the vertical synchronizing signal VD are respectively supplied through input terminals 7 and 8 to the other fixed contacts B of the change-over switches 5 and 6. The change-over switches 5 and 6 connect their movable contacts C to their fixed contacts A respectively when the horizontal and vertical synchronizing signals HD1 and VD are derived from the sync separator circuit 4, and to the other fixed contacts B, respectively, when the synchronizing signals HD1 and VD are applied respectively to the input terminals 7 and 8.

The horizontal synchronizing signal HD1 from the change-over switch 5 is supplied to a phase comparator 10 forming a PLL (phase-locked loop) circuit 9. A compared phase error signal from the phase comparator 10 is supplied through a low-pass filter 11 to a voltage controlled type variable frequency oscillator (hereinafter referred to as a VCO) 12 of the PLL circuit 9 as a control signal. An output signal S1 from the VCO 12 is fed back through a frequency divider 13 having a dividing ratio of 1/A (where A is an integer) to the phase comparator 10 so that the output of the divider 13 is a signal at the frequency of the horizontal synchronizing signal $HD_1$, the frequency of the output signal S1 is equal to $A \times F_{H1}$. A is selected to be, for example, 640.

The output signal S1 from the VCO 12 is supplied to the A/D converter 12 as a clock and to a write control circuit 14. The vertical synchronizing signal VD from the change-over switch 6 is also supplied to the write control circuit 14. The control circuit 14 controls the write address of the frame memory 3 to sequentially write the video signal SV1 in the frame memory 3.

The horizontal synchronizing signal HD1 from the change-over switch 5 is supplied through a frequency divider 15 having a dividing ratio of 1/n (where n is an integer) to a phase comparator 17 forming a PLL (phase-locked loop) circuit 16. A compared phase error signal from the phase comparator 17 is supplied through a low-pass filter 18 to a VCO 19 of the PLL circuit 16 as a control signal. An output signal S2 from the VCO 19 is fed back through a series circuit of a frequency divider 20 having a dividing ratio of 1/A and a frequency divider 21 having a dividing ratio of 1/m (m is an integer) to the phase compartor 17. Thus, the frequency of the output signal S2 becomes $m/n\,A \times f_{H1}$. In this case, the values n and m are both automatically determined in such a manner that the frequency $m/n \times f_{H1}$ of the output signal from the frequency divider 20 becomes substantially equal to a target frequency $f_{H2}$ of an output video signal SV2.

In this embodiment, n and m are both determined automatically such that if the target line frequency $f_{H2}$ of the output video signal SV2 is 63.35 kHz and the line frequency $f_{H1}$ of the input video signal SV1 is in a range from 15.53 kHz to 64.55 kHz. The frequency $m/n \times f_{H1}$ of the output signal HD2 from the 1/A frequency divider 20 falls within a range of 62.15 kHz to 64.55 kHz; accordingly, the frequency of the output signal S2 from the VCO 19 falls within a range of $62.15 \times A$ kHz to $64.55 \times A$ kHz.

An output signal Sc from the low-pass filter 18 is supplied to comparators 22 and 23. The comparators 22 and 23 are respectively supplied with reference voltages V1 and V2. The value of the reference voltage V1 is made equal to that of the output signal Sc from the low-pass filter 18 when the frequency of the output signal from the VCO 19 is $64.55 \times A$ kHz. The value of the reference voltage V2 is made equal to that of the output signal Sc from the low-pass filter 18 when the frequency of the output signal from the VCO 19 is $62.15 \times A$ kHz. The comparator 22 generates a signal $S_{P1}$ which becomes high (level "1") when the output signal Sc is larger than the reference voltage V1 and becomes low (Level "0") in other cases. The comparator 23 generates a signal $S_{P2}$ which becomes high (level "1") when the output signal Sc is smaller than the reference voltage V2 and becomes low (level "0") in other cases. The signals $S_{P1}$ and $S_{P2}$ from the comparators 22 and 23 are supplied respectively to three-input AND circuits 24 and 25. The vertical synchronizing signal VD derived from the change-over switch 6 is supplied to another input of each of the AND circuits 24 and 25.

An up/down counter 26 is provided at the output sides of the AND circuits 24 and 25. The up/down counter 26 receives at its up control terminal UP the output signal of the AND circuit 24 and also receives at its down control terminal DOWN the output signal of the AND circuit 25. When receiving at its control terminal UP or DOWN a signal "1" of high level, the up/down counter 26 increments or decrements its count value by 1. When the power switch is turned on, the up/down counter 26 receives a reset signal $S_R$ to reset its count value, for example, to 0.

The count output from the up/down counter 26 is supplied to ROMs (read-only memories) 27 and 28 storing conversion tables. The output signals from the ROMs 27 and 28 are supplied respectively to the frequency dividers 15 and 21 as the control signals, to designate the dividers used be each divider. Specifically, the ROMs 27 and 28 generate output signals to control the values n and m of the frequency dividers 15 and 21 in response to the respective area numbers No as seen in the following table I.

TABLE I

| No | n | m | n/m | output 62.15 kHz | input frequency (kHz) output 64.55 kHz |
|---|---|---|---|---|---|
| 0 | 1 | 4 | 0.25 | 15.5375 kHz | 16.1375 kHz |
| 1 | 8 | 31 | 0.25806 | 16.038 | 16.6578 |
| 2 | 5 | 19 | 0.26316 | 16.3554 | 16.9870 |
| 3 | 4 | 15 | 0.26667 | 16.5735 | 17.2135 |
| 4 | 3 | 11 | 0.27273 | 16.9502 | 17.6047 |
| 5 | 5 | 18 | 1.27778 | . | . |
| 6 | 2 | 7 | 0.28571 | . | . |
| 7 | 5 | 17 | 0.29412 | . | . |
| 8 | 3 | 10 | 0.30000 | . | . |
| 9 | 4 | 13 | 0.30769 | . | . |
| 10 | 6 | 19 | 0.31579 | . | . |
| 11 | 10 | 31 | . | . | . |
| . | . | . | . | . | . |
| . | . | . | . | . | . |
| . | . | . | . | . | . |
| 56 | 8 | 9 | . | . | . |
| 57 | 11 | 12 | . | . | . |
| 58 | 15 | 16 | . | . | . |
| 59 | 29 | 30 | 0.96667 | . | . |
| 60 | 31 | 32 | 0.96875 | 60.2078 | 62.5328 |
| 61 | 1 | 1 | 1.00000 | 62.15 kHz | 64.55 kHz |

As shown on the table I, the area number No is selected to range from 0 to 61.

The ROM 27 generates an overflow signal $S_{OF}$ which becomes high (level "1") when the count output from the up/down counter 26 falls within a range of 0 to 61 while low (level "0") in other cases. The overflow signal $S_{OF}$ is supplied to the AND circuits 24 and 25.

The overflow signal $S_{OF}$ is also supplied to an indicator 29 to enable the indicator 29 to perform, for example, an error indication when the signal $S_{OF}$ is at low level "0".

With the above mentioned circuit arrangement, when the frequency of the output signal S2 from the VCO 19 is higher than $64.5 \times A$ kHz, the value of the output signal Sc from the low-pass filter 18 becomes larger than that of the reference voltage V1, making the output signal $S_{P1}$ of the comparator 22 at the high level "1". As a result, in synchronism with the vertical synchronizing signal VD, the high level signal "1" is supplied to the up control terminal UP of the up/down counter 26 to cause the counter 26 to increment its count value by 1. The values n and m of the frequency dividers 15 and 21 are controlled in response to the thus incremented count output (area number No) to lower the frequency of the output signal S2 from the VCO 19. The above operation is repetitively carried out during a period in which the frequency of the output signal S2 from the VCO 19 is higher than $64.55 \times A$ kHz. On the other hand, when the frequency of the output signal S2 from the VCO 19 becomes lower than $64.55 \times A$ kHz, the value of the output signal Sc from the low-pass filter 18 becomes smaller than that of the reference voltage V1, making the output signal $S_{P1}$ from the comparator 22 low in level "0". As a result, the signal of high level "1" is not supplied to the up control terminal UP of the counter 26 to disable the counter 26 to increment its count value. Accordingly, the values n and m of the frequency dividers 15 and 21 are fixed to the area numbers No which are the count outputs of the counter 26 at that time.

When the frequency of the output signal S2 from the VCO 19 is lower than $62.15 \times A$ kHz, the value of the output signal Sc from the low-pass filter 18 becomes smaller than that of the reference voltage V2, making the output signal $S_{P2}$ from the comparator 23 high in level "1". As a result, the signal of high level "1" is supplied to the down control terminal DOWN of the up/down counter 26 in synchronism with the vertical synchronizing signal VD to cause the counter 26 to decrement its count value by 1. Then, the values n and m of the frequency dividers 15 and 21 are controlled in response to the thus decremented count output (area number No) to make the frequency of the output signal S2 from the VCO 19 higher. The above mentioned operation is repetitively carried out during a period in which the frequency of the output signal S2 from the VCO 19 is lower than $62.15 \times A$ kHz. When on the other hand the frequency of the output signal S2 from the VCO 19 becomes higher than $62.15 \times A$ kHz, the value of the output signal Sc from the low-pass filter 18 becomes larger than that of the reference voltage V2, making the output signal $S_{P2}$ from the comparator 23 low in level "0". As a result, the signal of high level "1" is not supplied to the down control terminal DOWN of the up/down counter 26 so that the counter 26 is disabled to decrement its count value. Thus, the values n and m of the frequency dividers 15 and 21 are fixed to the values of the area numbers No which are derived from the counter 26 as the count outputs at that time.

Further, when the count output of the counter 26 takes other value than 0 to 61, the overflow signal $S_{OF}$ from the ROM 27 becomes low in level "0" so that the signal of high level "1" is not supplied to the up and down control terminals UP and DOWN of the counter 26 from the AND circuits 24 and 25, thus disabling the counter 26 to decrement or increment its count value. Therefore, the values n and m of the frequency dividers 15 and 21 are fixed to the values of the area numbers No which are derived from the counter 26 as the corresponding count outputs at that time. At that time, the error indication is performed by the indicator 29. When the horizontal frequency $F_{H1}$ of the input video signal SV1 lies in a range of 15.53 kHz to 64.55 kHz, it is apparent from the foregoing table I that the area number No, which is the count output from the counter 26, falls in a range from 0 to 61, taking no other values. In other words, the error indication is made by the indicator 29 only when the line frequency $f_{H1}$ of the input video signal SV1 does not fall in a range from 15.53 kHz to 64.55 kHz.

Consequently, when the line frequency $f_{H1}$ of the input video signal SV1 falls within the range from 15.53 kHz to 64.55 kHz, the values n and m of the frequency dividers 15 and 21 are determined automatically and the frequency of the output signal S2 from the VCO 19 is made in the range from $62.15 \times A$ kHz to $64.55 \times A$ kHz.

Figure 2:
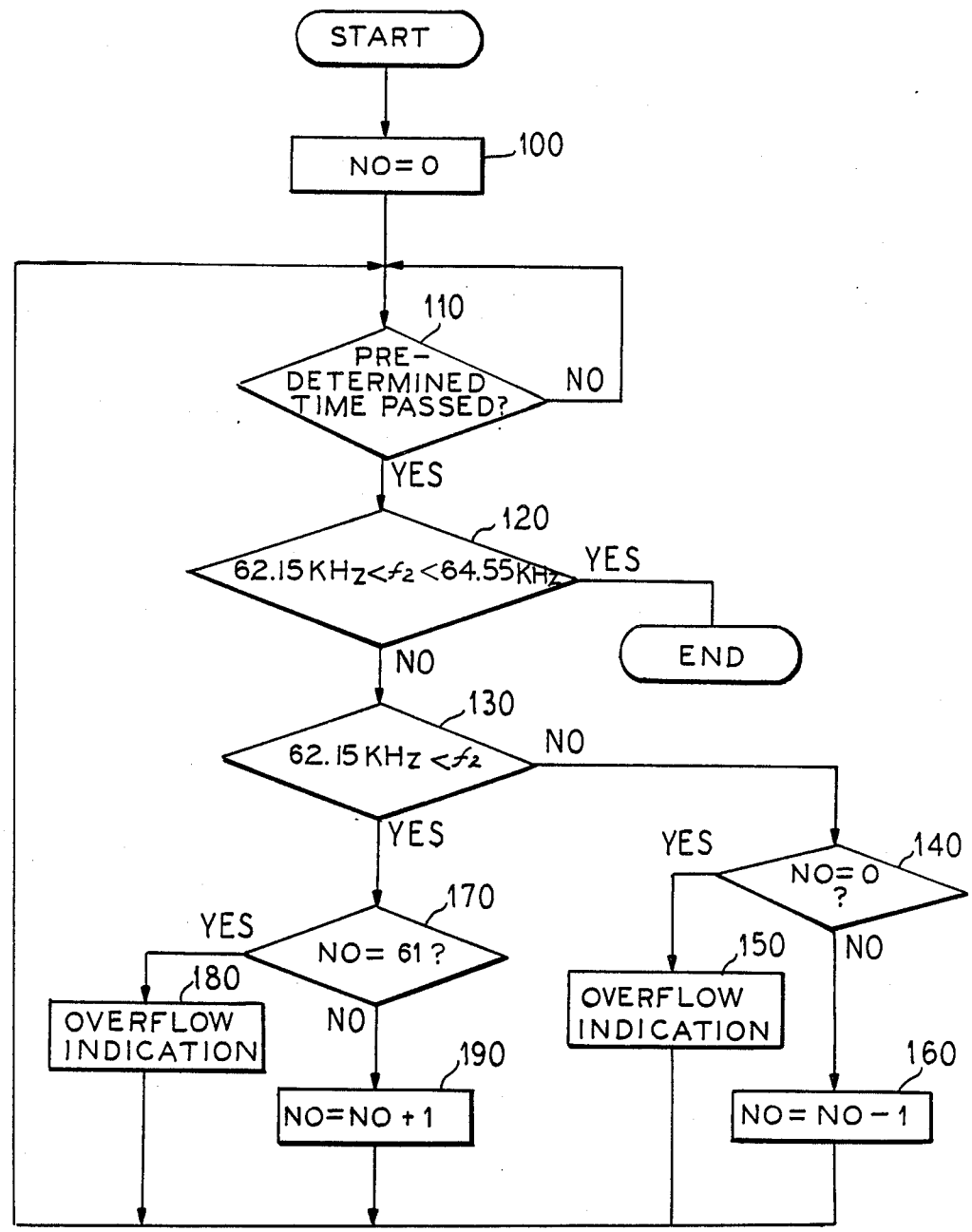
FIG. 2 is a flow chart to which reference will be made in explaining the operation of the embodiment of the present invention.

The operations of the above mentioned hardware or circuit arrangement to determine the area number No are represented in the flow chart forming FIG. 2. The boxes or steps of the flow chart can be taken to represent steps in the program of a microcomputer controlling apparatus like that shown in FIG. 1, or alternatively, circuit units which perform the indicated function of the steps.

When the power switch is turned on, the area number No is set to 0 at step 100. Then, the program goes to decisional step 110, in which it is judged whether or not a predetermined time period longer than a locking time of the PLL circuit 16 has passed. During this time, the vertical synchronizing signal VD is supplied to the AND circuits 24 and 25 in the embodiment in FIG. 1. After the predetermined time period (longer than the locking time of the PLL circuit 16) passes, as represented by a YES at step 110, the program goes to the next decisional step 120. Then, it is judged at decisional step 120 whether or not the frequency f2 of the output signal from the frequency divider 20 falls in the range from 62.15 kHz to 64.55 kHz. If the frequency f2 does not fall in the range from 62.15 kHz to 64.55 kHz as represented by a NO at step 120, the program goes to the next decisional step 130. It is judged at decisional step 130 whether the frequency f2 of the output signal from the frequency divider 20 is higher than 62.15 kHz or not. If it is lower than 62.15 kHz as represented by a NO at step 130, the program goes to the next decisional step 140. Then, it is judged at step 140 whether the area number No is 0 or not. If the area number No is 0 as represented by a YES at step 140, the program goes to the next step 150. At step 150, the overflow indication (or the error indication in the embodiment of FIG. 1) is performed. If on the other hand the area number No. is not 0 as represented by a NO at step 140, the program goes to step 160. At step 160, the area number No is decremented by 1 and the program goes back to step 110.

If it is judged at decisional step 130 that the frequency f2 of the output signal from the frequency divider 20 is not higher than 62.15 kHz, the program goes to step 170. Then, it is judged at decisional step 170 whether the area number No is 61 or not. If the area number No is 61 as represented by a YES at step 170, the program goes to step 180, in which the overflow indication is carried out. If on the other hand the area number is not 61 as represented by a NO at step 170, the program goes to step 190. At step 190, the area number No is incremented by 1, and then the program goes back to step 110.

If it is judged at decisional step 120 that the frequency f2 of the output signal from the frequency divider 20 does not fall in the range from 62.15 kHz to 64.55 kHz, the above mentioned operations are carried out repetitively. When the frequency f2 falls in the range from 62.15 kHz to 64.55 kHz as represented by a YES at step 120, the operation is ended and the area number No is determined.

Further, since the frequency of the output signal S2 from the VCO 19 is made in the range from $62.15 \times A$ kHz to $64.55 \times A$ kHz as described hereinabove, the frequency $f2 = m/n \times f_{H1}$ of the output signal from the frequency divider 20 falls in the range from 62.15 kHz to 64.55 kHz. This output signal is fed to an output terminal 30 as a horizontal synchronizing signal HD2 of the output video signal SV2, as illustrated in FIG. 1.

Turning back to FIG. 1, the horizontal synchronizing signal HD1 derived from the change-over switch 5 is supplied to a phase comparator 32 forming a PLL circuit 31. A compared error signal from the phase comparator 32 is supplied through a low-pass filter 33 to a VCO 34 of the P11 circuit 31 as a control signal. An output signal S3 from the VCO 34 is fed back through a frequency divider 35 having a dividing ratio of 1/512 to the phase comparator 32 so that the frequency of the output signal S3 from the VCO 34 comes to $512 \times f_{H1}$.

Of the 9 bit binary count output from the frequency divider 35, the lower 8 bits are supplied to a latch circuit 36. The horizontal synchronizing signal HD2 of the output video signal SV2 derived from the frequency divider 20 is supplied to the latch circuit 36 as a latch pulse to latch the count output. The output signal from the latch circuit 36 is supplied to a D/A (digital-to-analog) converter 37. From the D/A converter 37, an output signal $E_{A/D}$ and an opposite phase voltage $\overline{E_{A/D}}$ are produced which are then supplied to a read control circuit 38. The output signal S2 from the VCO 19 is supplied to the read control circuit 38 and the vertical synchronizing signal VD derived from the change-over switch 6 is also supplied thereto.

The read control circuit 38 controls the read address of the frame memory 3 such that a scanning line signal ln of the present field and an adjacent scanning line signal lp of the immediately-preceding field are read out in a parallel manner from the frame memory 3 in synchronism with the horizontal synchronizing signal HD2. In this case, for example, the scanning line signal located on the upper side of the picture screen is supplied to a terminal 3a of the memory 3 whereas the signal located on the lower side of the picture screen is supplied to a terminal 3b from the memory 3. The scanning line signals developed at the terminals 3a and 3b are switched when the output signal $E_{A/D}$ from the D/A converter 37 becomes smaller than the former. For example, the scanning line signal ln of the present field is delivered to the terminal 3a, and the scanning line signal Lp of the immediately-preceding field delivered to the terminal 3b. The same scanning line signal is repetitively generated in synchronism with the horizontal synchronizing signal HD2 until the output signal $E_{A/D}$ from the output signal 37 becomes smaller than the former. When the output signal $E_{A/D}$ from the D/A converter 37 becomes smaller than the former, the scanning line signal lp of the immediately-preceding field generated from the terminal 3b is generated from the terminal 3a and the scanning line signal ln of the present field and adjacent just below the scanning line signal lp is developed at the terminal 3b. Until the output signal $E_{A/D}$ from the D/A converter 37 becomes larger than the former value, the same scanning line signal is repetitively generated in synchronism with the horizontal synchronizing signal HD2. When the output signal $E_{A/D}$ from the D/A converter 37 becomes larger, the scanning line signal n of the present field which has been generated from the terminal 3b up to that time is generated from the terminal 3a, whereas the scanning line signal lp of the immediately-preceding field and adjacent just below the scanning line signal n is generated from the terminal 3b. Then, until the output signal $\overline{E_{A/D}}$ from the D/A converter 37 becomes larger, the same scanning line signal is repetitively generated in synchronism with the horizontal synchronizing signal HD2. The above mentioned read operation is repetitively carried out thereafter.

Therefore, since the frequency of the horizontal synchronizing signal HD2 is m/n $f_{H1}$ relative to the frequency $f_{H1}$ of the horizontal synchronizing signal HD1 of the input video signal SV1, m scanning line signals are generated at the terminals 3a and 3b of the frame memory 3 for n scanning line signals of the input video signal SV1.

The scanning line signals developed at the terminals 3a and 3b of the frame memory 3 are supplied respectively to D/A converters 39 and 40, in which they are converted into analog signals. The output signal S2 from the VCO 19 is supplied to the D/A converters 29 and 40 as a clock. In this case, in the D/A converters 29 and 40, the scanning line signals of upper and lower sides on the picture screen are amplitude-limited in association with the time base in the vertical direction. This will be described more fully. From the read control circuit 38, the output signal $E_{A/D}$ from the D/A converter 37 is supplied to the A/D converter 40 as a reference voltage. At the same time, the D/A converter 39 is supplied with the opposite phase voltage $\overline{E_{A/D}}$ from the D/A converter 37 through the read control circuit 38 as a reference voltage.

The scanning line signals of the upper and lower sides on the picture screen, which are converted into the analog signals by these D/A converters 39 and 40, are supplied to and added each other by an adder 41. The added signal from the adder 41 is supplied through a low-pass filter 42 to an output terminal 43 as the output video signal SV2.

FIGS. 3A and 3B illustrate the relationship between the horizontal synchronizing signal HD1 of the input video signal SV1 and the horizontal synchronizing signal HD2 of the output video signal SV2 for the case in which n/m is ⅜. In this case, 8 scanning line signals of the outupt video signal SV2 are formed in response to 3 scanning line signals of the input video signal SV1.

When the structure of the scanning lines of the input video signal SV1 is provided, for example, as shown in FIG. 4A (each of l1 to l4 is the scanning line of the immediately-preceding field and each of l5 to l9 is the scanning line of the present field), the scanning line structure of the output video signal SV2 becomes as shown in FIG. 4B. For example, scanning lines k1 to k8 are formed in response to, for example, the scanning lines l5 to l7. At that time, the scanning line signals of the scanning lines k1 to k8 are each formed by adding the scanning line signals of the present line and the scanning line signals of the immediately-preceding field with a ratio relating to the time base in the vertical direction as follows.

| | |
|---|---|
| k1 = l5 | k2 = ⅜l5 + ⅝l11 |
| k3 = 2/4 l11 + 2/4 l6 | k4 = ⅝l6 + ⅜l12 |
| k5 = l2 | k6 = ⅜l12 + ⅝l17 |
| k7 = 2/4 l17 + 2/4 l13 | k8 = ⅝l13 + ⅜l18 |

According to this embodiment, as set forth above, the output video signal SV2 having m scanning line signals for n scanning line signals of the input video signal SV1 is obtained. The line frequency of the video signal SV2 becomes m/n $f_{H1}$, which is substantially equal to the target line frequency $f_{H2}$. In other words, according to this embodiment, when the line frequency $f_{H1}$ of the input video signal SV1 falls in the range from 15.53 kHz to 64.55 kHz, it is possible to obtain the output video signal SV2 having the line frequency substantially equal to the target line frequency $f_{H2}$.

Therefore, according to this embodiment, even when the target line frequency $f_{H2}$ of the output video signal SV2 is not an integral multiple of the line frequency $f_{H1}$ of the input video signal SV1, it is possible to satisfactorily obtain the output video signal SV2 of which the line frequency is substantially $f_{H2}$.

While the scan converter apparatus of the present invention can provide the output video signal SV2 having the target line frequency $f_{H2}$ of 63.35 kHz when the line frequency $f_{H1}$ of the input video signal SV1 falls in the range from 15.53 kHz to 64.55 kHz as described hereinabove, the scan converter apparatus is not limited to the above mentioned arrangement but can take various modifications and variations with similar action and effect being achieved.

Figure 5:
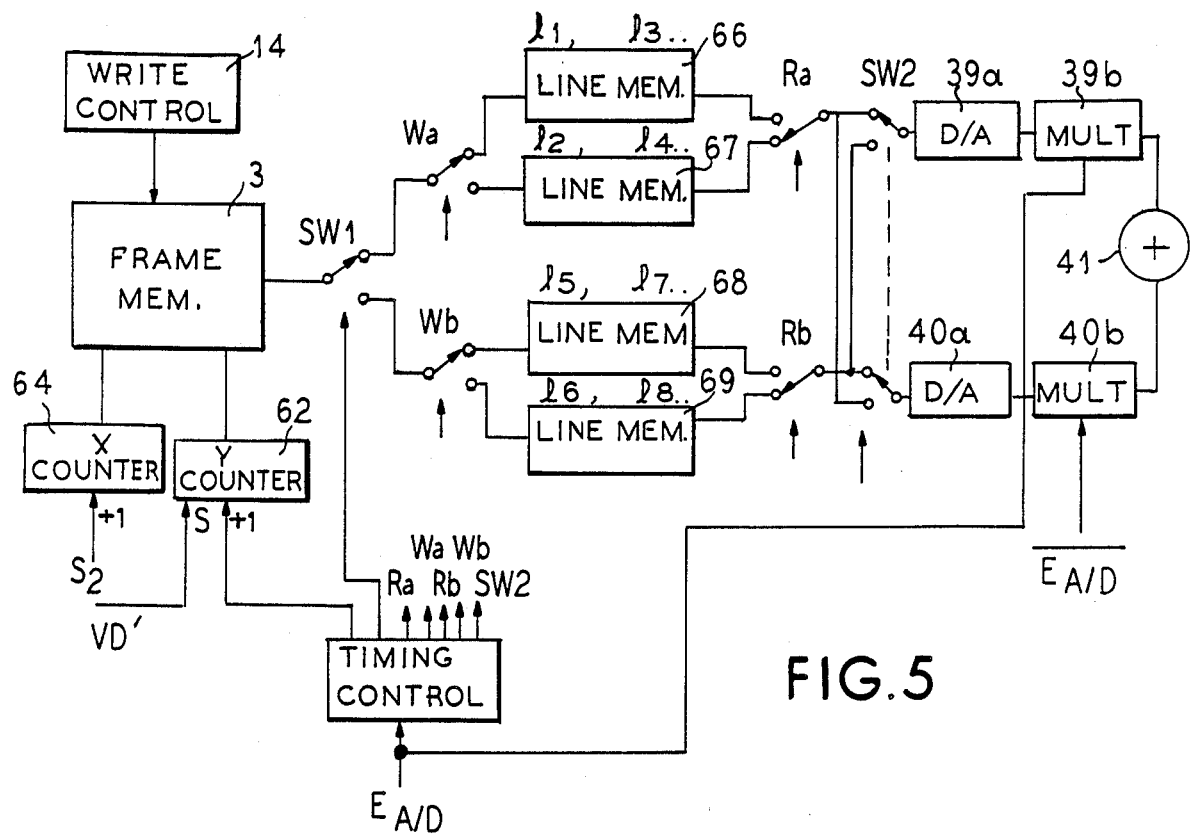
FIG. 5 is a block diagram showing a portion of FIG. 1 in more detail.
Figure 6:
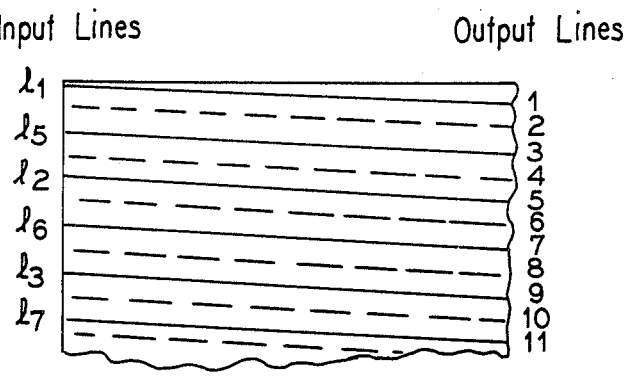
FIG. 6 is a schematic diagram showing the scanning lines of the input and output video signals for a ratio of $\frac{1}{4}$.

FIG. 5 illustrates details of the read control circuit 38, as well as some of the associated circuits shown in FIG. 1. The frame memory 3 is addressed, for reading, by a Y counter 62 and an X counter 64, which address data corresponding to scan lines and pixels in a scan line, respectively. The X counter has a radix of 640, in the case of 640 pixels per scan line, and is incremented by S2. The Y counter has a radix at least equal to the number of scan lines stored in the frame memory 3 and is incremented each time $E_{A/D}$ increases in value, which may be determined by a simple circuit (not shown) using a sample and hold unit for temporarily storing the $E_{A/D}$ value (clocked by S2 for example) and a comparator for comparing the old and new values of $E_{A/D}$. Four line memories 66-69 are provided, for storing data corresponding to the scan line corresponding to the state of the Y counter 62. The line memory which is being loaded at any time is determined by switches SW1, Wa and Wb. The switch SW1 is changed or toggled with each determination of an increased value of $E_{A/D}$, as described above. The switches Wa and Wb are toggled alternately, with the switch SW1, so that the four line memories are loaded successively, for each four cycles or increases in the value of $E_{A/D}$. The scan lines are stored in the memory in the order 5-1-6-2-7-3-8, in the case of two interlaced fields as illustrated in FIG. 4A. The two interlaced fields may be stored in the order 1-5-2-6, etc., as shown in FIG. 6.

Two of the four memories are read out during each cycle of the output video signal. The line memories which are read out at any time are those which contain the two lines of the input video signal corresponding the closest to the line position of the current line of the output video. One of the two upper line memories 66 and 67 is selected by a switch Ra and one of the two other line memories 68 and 69 is selected by the switch Rb. The switches Ra and Rb operate in synchronism with the switches Wa and Wb. Thus, it is assumed that no line memory is written and read from during the same cycle.

The outputs of the switches Ra and Rb are directed either to the D/A 39 or to the D/A 40, each of which is made up of a converter portion 39a or 40a and an analog multiplier portion 39b or 40b. The signals $E_{A/D}$ and $\overline{E_{A/D}}$ are supplied as inputs to the two multipliers 39b and 40b in order to mix the analog pixel signals from the two lines proportionately in the summer unit 41 so that the output video line corresponds to the correct proportion of the two adjacent input lines, in accordance with the relative position of the output line. This position is manifested by the signal $E_{A/D}$, as a result of latching the lower 8 bits of the signal manifested by the divider counter 35, at the time of HD2. Since only the lower 8 bits are supplied to the latch 36, there are two cycles of input signals supplied to the latch for each cycle of the input video signal. The switch SW2 is toggled with each increase in the value of $E_{A/D}$.

A timing control unit 70 develops the appropriate signals for controlling the switches SW1, SW2, Ra, Rb, Wa and Wb at the proper times, and for incrementing the Y counter 62. The signal VD' is the vertical sync signal of the input video, delayed to correspond to the end of a line of the output video. Alternatively, it can be delayed to correspond to the end of an output frame. The signal VD' causes the Y counter 62 to be set to the appropriate location in the frame memory 3 for the next frame of the input video, so the output video signal reproduces the input video frame-by-frame.

Table 2 shows the sequence of operations for several cycles of assuming a ratio of ¼ and assuming also that $E_{A/D}$ has a range of 0 to 100 (so that $\overline{E_{A/D}}$ ranges from 100 to 0) and that the value of $E_{A/D}$ at the starting time is arbitrarily assumed to be equal to 100.

TABLE 2

| Output Line No. | $E_{A/D}$ | $\overline{E_{A/D}}$ | Read 3a | 3b | Write | SW1 | Wa | Wb | Ra | Rb | SW2 |
|---|---|---|---|---|---|---|---|---|---|---|---|
| 1 | 100 | 0 | 11 | 15 | 12 | U | D | — | U | U | U |
| 2 | 50 | 50 | 11 | 15 | 12 | U | D | — | U | U | U |
| 3 | 100 | 0 | 15 | 12 | 16 | D | — | D | D | U | D |
| 4 | 50 | 50 | 15 | 12 | 16 | D | — | D | D | U | D |
| 5 | 100 | 0 | 12 | 16 | 13 | U | U | — | D | D | U |
| 6 | 50 | 50 | 12 | 16 | 13 | U | U | — | D | D | U |
| 7 | 100 | 0 | 16 | 13 | 17 | D | — | U | U | D | D |
| 8 | 50 | 50 | 16 | 13 | 17 | D | — | U | U | D | D |
| 9 | 100 | 0 | 13 | 17 | 14 | U | D | — | U | U | U |
| 10 | 50 | 50 | 13 | 17 | 14 | U | D | — | U | U | U |
| 11 | 100 | 0 | 17 | 14 | 18 | D | — | D | D | U | D |
| 12 | 50 | 50 | 17 | 14 | 18 | D | — | D | D | U | D |

The above description is given on a single preferred embodiment of the invention but it will be apparent that many modifications and variations could be effected by one skilled in the art without departing from the spirits or scope of the novel concepts of the invention so that the scope of the invention should be determined by the appended claims only.

I claim as my invention:

1. A scan converter apparatus for converting an input video signal having a line frequency $f_{H1}$ into an output video signal of which the line frequency is substantially $f_{H2}$ comprising:
   (a) memory means for storing said input video signal in synchronism with its horizontal synchronizing signal;
   (b) means for approximating a ratio $f_{H1}/f_{H2}$ between said line frequencies of said input and output video signals to n/m (where m and n are both integers);
   (c) a phase-locked loop circuit including a phase comparator, a low-pass filter and a voltage-controlled oscillator connected to receive the horizontal synchronizing signal of said input video signal and for generating a modified frequency signal having a line frequency m/n times the line frequency $f_{H1}$ of said input video signal;

(d) control means for controlling the reading operation from said memory in synchronism with said modified frequency signal to thereby generate said output video signal;

(e) said horizontal synchronizing signal of said input video signal being supplied through a frequency divider having a frequency dividing ratio of 1/n to said phase comparator in said phase locked loop circuit; and (f) means for supplying an output from said voltagecontrolled oscillator in said phase locked loop circuit through a frequency divider having a frequency dividing ratio of 1/m to said phase comparator.

2. A scan converter apparatus according to claim 1, wherein a frequency divider having a frequency dividing ratio of 1/A (where A is an integer) is connected between said voltage-controlled oscillator and said frequency divider having the frequency dividing ratio of 1/m, and means for connecting the output from said voltage-controlled socillator to the read clock input of said memory.

3. A scan converter apparatus according to claim 2, including means for deriving the line frequency signal of said output video signal from an output of said frequency divider having the frequency dividing ratio of 1/A.

4. A scan converter appartus according to claim 1, including a pair of read-only-memories, means connecting said dividing ratios of 1/n and 1/m to said read-only memories to receive from said read-only memories the values n and m, in response to the line frequency of said input video signal.

5. A scan converter apparatus according to claim 4, further comprising means for detecting an output level of said low-pass filter, and means for controlling the reading operation from said read-only memories in response to detected output from said detecting means.

6. A scan converter apparatus according to claim 5, wherein said read-only memories store a plurality of conversion tables by which said values n and m are determined, in response to said line frequency of said input video signal.

7. A scan converter apparatus according to claim 6, wherein said detecting means detects whether or not the output level of said low-pass filter falls within a predetermined range and the addresses of said read-only memories are incremented or decremented when said output level is out of said predetermined range.

8. A scan converter apparatus for converting an input video signal having a line frequency $f_{H1}$ into an output video signal of which the line frequency is substantially $f_{H2}$ comprising:

(a) memory means for storing said input video signal in synchronism with its horizontal synchronizing signal;

(b) means for approximating a ratio $f_{H1}/f_{H2}$ between said line frequency of said input and output video signals to n/m (where the ratio of m to n is not an integer);

(c) a phase-lock loop circuit including a phase comparator, a low-pass filter and a voltage-controlled oscillator connected to receive the horizontal sychronizing signal of said input video signal and for generating a modified frequency signal having a line frequency m/n times the line frequency $f_{H1}$ of the input vide signal; and (d) control means for controlling the reading operation from said memory in synchronism with said modified frequency signal to thereby generate an output video signal.

* * * * *